April 11, 1950    S. FISHER    2,503,382
ELECTRODE TIP CLEANING DEVICE
Filed July 2, 1949    4 Sheets-Sheet 2
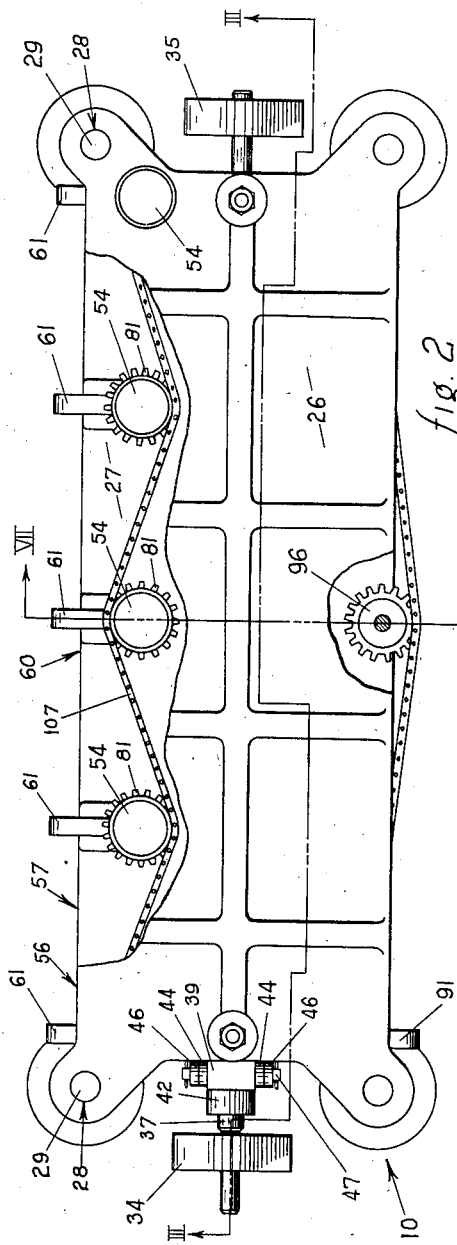
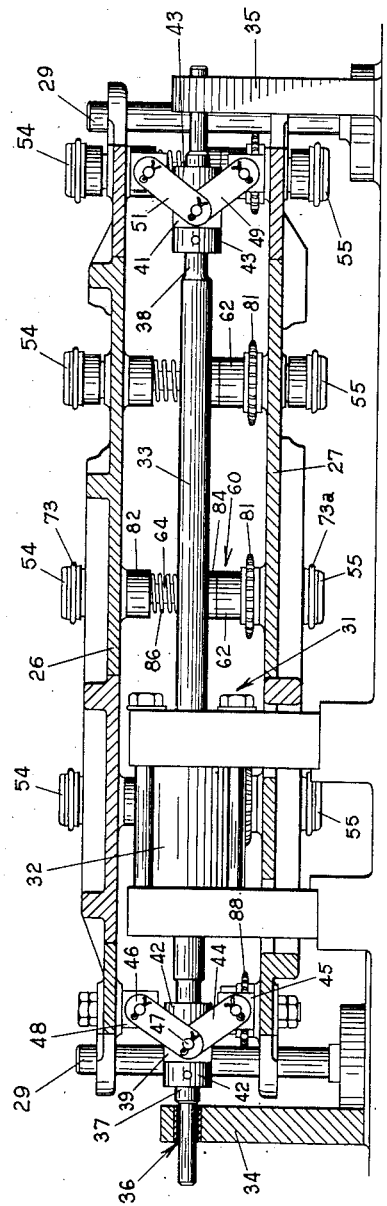
Inventor
SIMON FISHER
By
Attorney April 11, 1950     S. FISHER     2,503,382
ELECTRODE TIP CLEANING DEVICE
Filed July 2, 1949     4 Sheets-Sheet 3
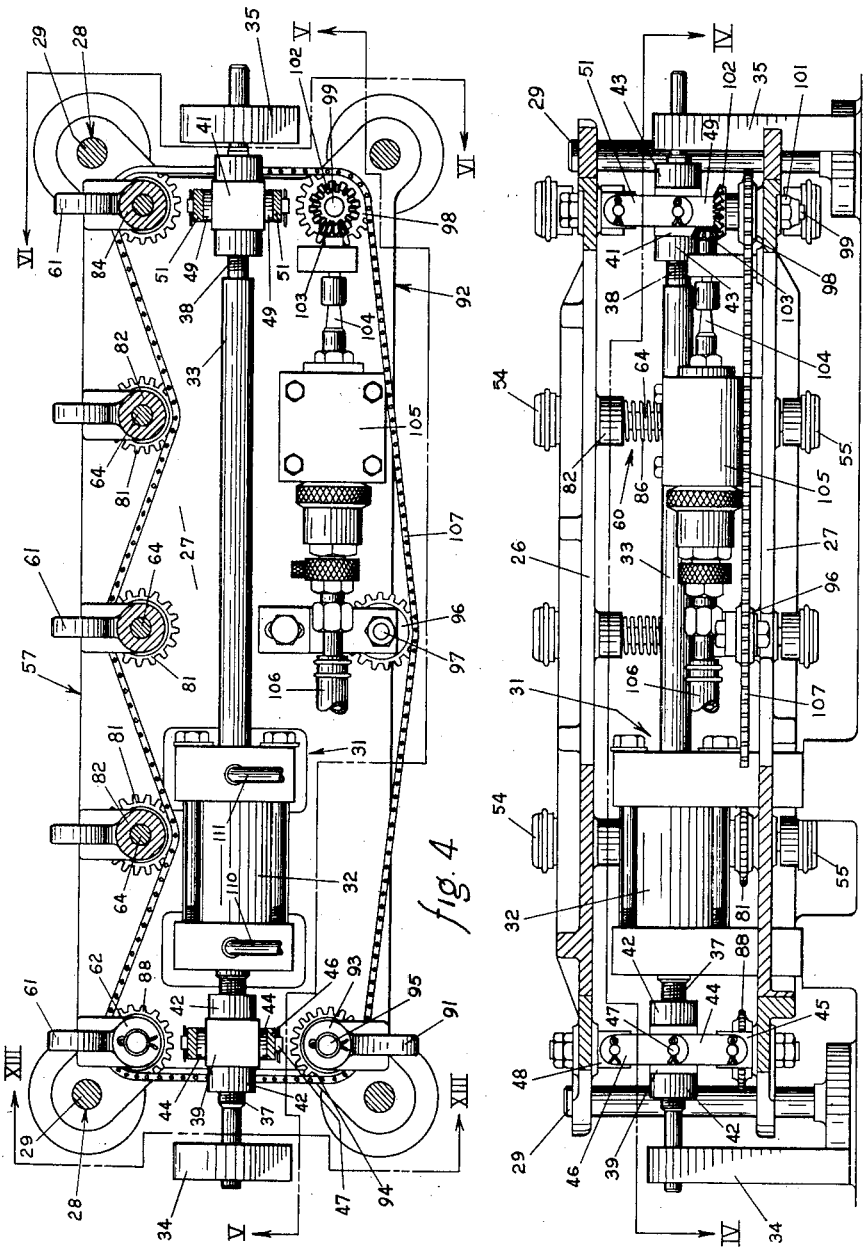
Inventor
SIMON FISHER
By
Attorney April 11, 1950 S. FISHER 2,503,382
ELECTRODE TIP CLEANING DEVICE
Filed July 2, 1949 4 Sheets-Sheet 4
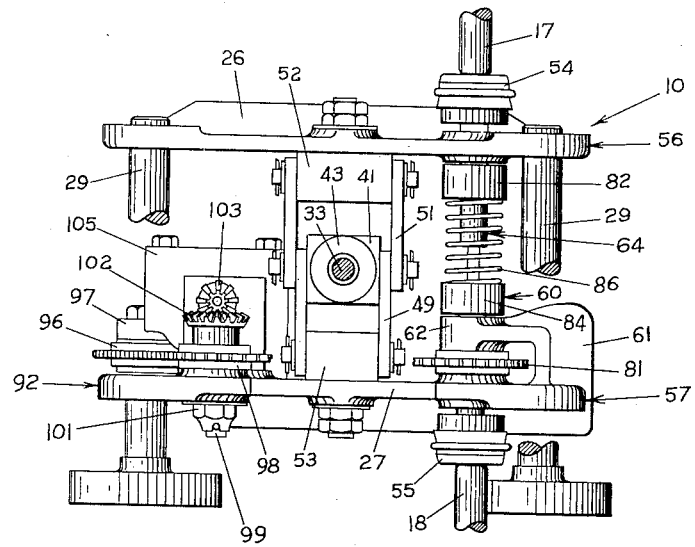
fig. 6
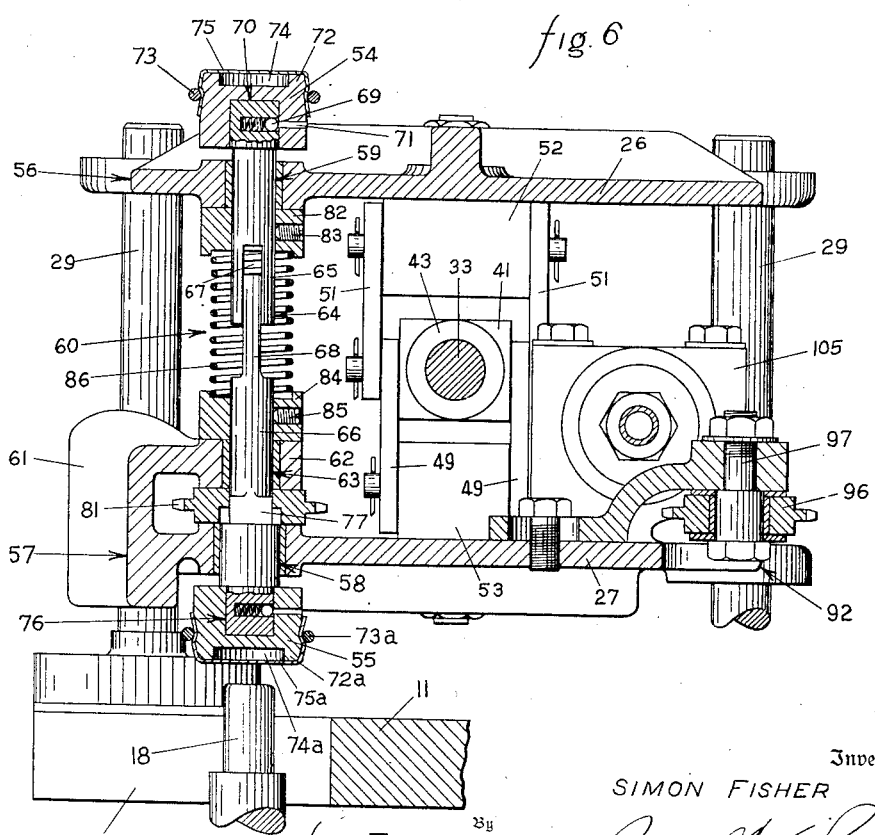
fig. 7
Inventor
SIMON FISHER
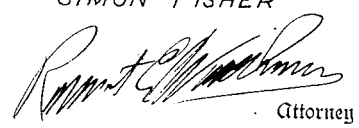
Attorney Patented Apr. 11, 1950

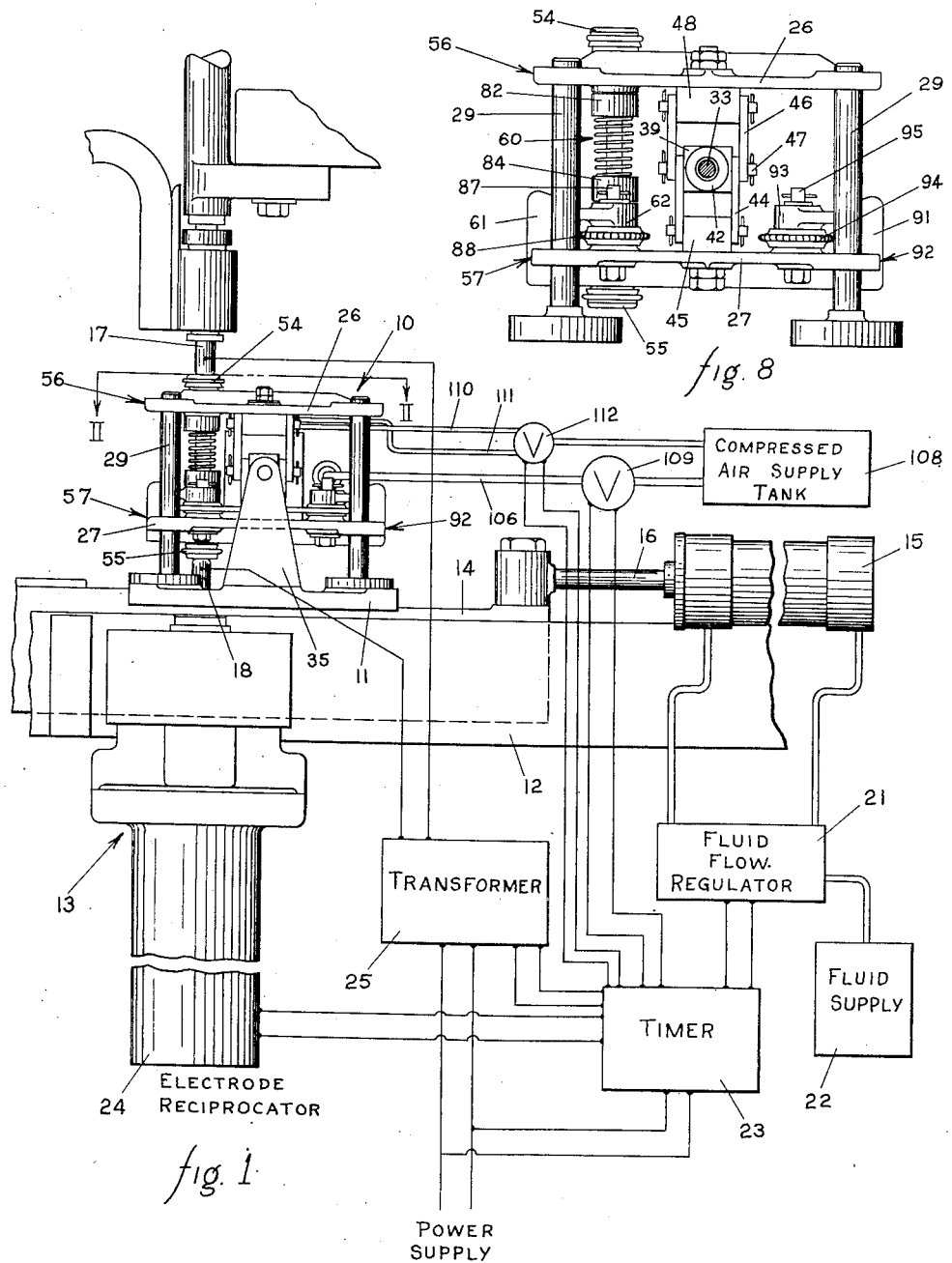

2,503,382

UNITED STATES PATENT OFFICE 2,503,382

ELECTRODE TIP CLEANING DEVICE

Simon Fisher, Bay City, Mich., assignor to National Electric Welding Machines Company, Bay City, Mich., a corporation of Michigan Application July 2, 1949, Serial No. 102,903

7 Claims. (Cl. 51—241)

This invention relates in general to a cleaning device for welding electrodes, and more particularly to a type thereof which is automatically operable with a resistance welding machine having one or more welding electrodes for automatically cleaning the tips of said electrodes.

It has been found that the work engaging tips of electrodes on resistance welding machines often become fouled with particles of foreign material during the normal operation of the machine. This contamination of the electrode tips often results in a defective weld and reduces the efficiency of the machine.

The particles causing this fouling appear to be particles of the oxide of the material being welded, which forms in air very quickly with aluminum and has even been observed to form with mild steel. Hence, the problem of cleaning the electrode tips, which problem has always been serious in the case of aluminum welding is now beginning to be recognized in mild steel welding. Many attempts have been made to deal with tip fouling resulting from such oxide formation, but these have progressed little, if any beyond the hand tool stage.

Accordingly, a primary object of this invention is to provide a device mountable upon a resistance welding machine having one or more electrodes, which device will automatically clean the tips of the welding electrodes and will do so in timed sequence with the operation of the machine.

A further object of this invention is to provide an electrode tip cleaning device, as aforesaid, which will operate with an automatic, multiple electrode, resistance welding machine.

A further object of the invention is to provide an efficient, compact and effective electrode tip cleaner which may be independently supported, as on a cable, for the effective cleaning of electrode tips at the will of an operator.

A further object of this invention is to provide a device as aforesaid which will increase the efficiency of, and reduce the defective welds produced by, a resistance welding machine.

Other objects and purposes of this invention will become apparent to persons familiar with this type of equipment upon referring to the accompanying drawings and upon reading the following specification wherein there is disclosed for illustrative purposes one particular preferred embodiment illustrating my invention but which is by no means the only form of machine in which my invention may be used. In the description free use will be made of the terminology "upper" and "lower," "horizontal" and "vertical," and other terms analogous to, or derived from, each of these, which terms shall refer to the device as normally positioned for use in the particular embodiment here selected for description for illustrative purposes but which terms shall not be considered limiting in any sense.

In meeting those objects and purposes heretofore mentioned, as well as others incidental thereto and associated therewith, I have provided a welding tip cleaning device comprised of a pair of parallel, vertically spaced head plates slidably supported upon a plurality of corner posts, which posts are secured to a base plate, which may be slidably and reciprocably supported upon the frame of the welding machine or it may be supported on a suitable drop cord and controlled and guided by hand. Said head plates are held in vertically reciprocable relationship with each other and means is provided for effecting such reciprocation.

A plurality of tip cleaning heads are rotatably supported upon the mutually remote surfaces of said head plates for rotation about their respective vertical axes. Said cleaning heads are positioned upon said head plates so that they will engage the electrode tips of said welding machine when said base plate is moved into position between the electrodes, and said head plates are moved away from each other.

Each cleaning head on one head plate is secured to, and rotatable with, one end of a head shaft which is secured at its other end to a cleaning head on the other head plate, said head shafts each being extensible to cooperate with the reciprocations of said head plates in order that said heads may remain at all times substantially equidistant from their respective head plates. Each head shaft supports, and is rotatable with, a gear pinion intermediate said head plates, and all of said gear pinions are engaged by a chain for effecting simultaneous rotation of said several head shafts. Means is provided for driving said chain.

For illustrations of a preferred embodiment of the invention, attention is directed to the accompanying drawings in which:

Figure 1 is a broken, fragmentary, partially schematic, side elevation view of a particular resistance welding machine equipped with an embodiment of the electrode tip cleaning device to which this invention relates.

Figure 2, which is a sectional view of Figure 1 taken along the line II—II, shows a broken top plan view of the said tip cleaning device.

Figure 3 is a sectional view of Figure 2 taken along the line III—III.

Figure 4 is a sectional view of the said tip cleaning device substantially as taken along the line IV—IV of Figure 5.

Figure 5 is a sectional view of Figure 4 taken along the line V—V.

Figure 6 is a sectional view of Figure 4 taken along the line VI—VI.

Figure 7 is a sectional view of Figure 2 taken along the line VII—VII and showing also a portion of the associated welding machine.

Figure 8 is a sectional view of Figure 4 taken along the line XIII—XIII.

Construction

The electrode tip cleaning device 10 (Figure 1) to which this invention relates, has a base plate 11 which may be horizontally reciprocably supported with respect to the bed 12 of a conventional resistance welding machine 13. The base plate 11 may be secured upon a slider member 14 which is slidably supported upon the welding machine bed 12 and which may be reciprocably actuated by any suitable means, such as an actuating cylinder 15, operated by hydraulic or other fluid, which cylinder may be operably connected to said slider member 14 by means of the actuating arm 16.

Said cylinder will for illustrative purposes be hereinafter referred to as a "hydraulic actuating cylinder" but it will be understood that it might be any device for effecting controllable reciprocation without departing from the scope of the invention also for purposes of illustration the leftward side of the cleaning device 10, as shown in Figure 1, may hereinafter be referred to as the "leading" or "forward" side thereof and the rightward side of said device may be referred to as the "trailing" or "rearward" side The particular embodiment of the invention herein disclosed is illustratively designed for operation with a multiple electrode welding machine having a plurality of upper electrodes 17 and a plurality of lower electrodes 18, each lower electrode being directly and axially opposed by an upper electrode.

The cleaning device 10 is moved into position between the upper and lower electrodes 17 and 18, respectively, by the hydraulic actuating cylinder 15 in timed relationship to the vertically reciprocable movement of the lower electrodes 18. The base plate 11 which is preferably made from a durable metal, such as steel, is substantially rectangular in shape and is provided with suitable electrode recesses 19 (Figure 7) along its forward edge into which the lower electrodes 18 are received when the cleaning device 10 is moved into position, as shown in Figures 1 and 7, between the electrodes.

The hydraulic actuating cylinder 15 may be actuated in a conventional manner by a suitable fluid flow regulator 21 having a fluid supply 22. The fluid flow regulator 21 may in turn be electrically controlled by the same timer 23 which controls the lower electrode reciprocator 24 as well as the flow of current through the transformer 25 to said upper and lower electrodes 17 and 18, respectively. Both the transformer 25 and the timer 23 may be connected to an appropriate power supply in a conventional manner.

The electrode tip cleaning device 10 (Figures 2 through 7) is comprised of upper and lower head plates 26 and 27, respectively, which head plates are parallel to and spaced from each other and, in this embodiment of the invention, are preferably substantially rectangular in shape and horizontally disposed. The head plates (Figures 2 and 4) are provided with aligned vertical post openings 28 near their respective four corners, which openings are slidably associated with four vertical guide posts 29, which guide posts are secured to and supported upon the base plate 11 near its corresponding four corners. The head plates 26 and 27 are reciprocably held with respect to each other by means of a head plate reciprocating mechanism 31 which is positioned between said head plates.

In order to facilitate the disclosure of this invention, the left end of the cleaning device 10, as shown in Figures 2 and 3 will hereinafter be referred to as to the "leftward" end thereof and the right end of the device in Figures 2 and 3 will be referred to as the "rightward" end.

The head plate reciprocating mechanism 31 is comprised of a reciprocable cylinder 32 which is supported, through suitable openings in the lower head plate 27, upon the base plate 11. The said cylinder 32 may be of any convenient conventional type for effecting controllable reciprocation of a member, such as an air cylinder. A reciprocable shaft 33, which extends through the air cylinder 32 and is preferably coaxial therewith, is slidably supported at its opposite extremities (Figures 3 and 4) by means of the shaft supports 34 and 35 which are secured to and supported upon the base plate 11 near the opposite ends thereof. The shaft supports 34 and 35 are provided with suitable bushed openings 36 (Figure 3) through which said reciprocable shaft 33 may extend. This shaft is preferably parallel with, and approximately midway between, the head plates 26 and 27 and is axially reciprocated by the reciprocating cylinder 32 in line with the longitudinal center lines of said head plates.

The reciprocable shaft 33 has threaded portions 37 and 38 near the leftward and rightward ends, respectively, thereof adjacent to the end portions of the shaft. The threaded portions 37 and 38 slidably support a pair of toggle blocks 39 and 41, respectively, which blocks are sleeved on said threaded portions. The toggle block 39 is adjustably positioned upon the shaft threaded portion 37 by means of the threaded locking collars 42, and the toggle block 41 is positionable upon the shaft threaded portion 38 by means of the threaded locking collars 43 in a similar manner.

A pair of lower toggle arms 44, which are pivotally secured near their upper ends to opposite sides of the toggle block 39 by means of the toggle pin 47, extends substantially downwardly therefrom and are pivotally secured at their lower ends to a lower pivot block 45, which pivot block is secured to and supported upon the lower head plates 27 near the leftward end thereof. A pair of upper toggle arms 46, which are pivotally supported near their lower ends upon said toggle block 39 by means of said toggle pin 47 extend upwardly and are pivotally secured near their upper ends to the upper pivot block 48, which pivot block is secured to and suspended from the leftward end of the upper head plate 26. A pair of lower toggle arms 49 and upper toggle arms 51 extend between and are pivotally secured to the toggle block 41 and the upper and lower pivot blocks 52 and 53, respectively, at the rightward ends of the head plates 26 and 27 in the same manner as the toggle arms 44 and 46. Accordingly, when the reciprocating shaft 33 is in its leftward position, as shown in Figure 3, the head plates 26 and 27 are held by said toggle arms 44, 46, 49 and 51 at their closest position with respect to each other, and when the reciprocating shaft 33 is in its rightward position, as shown in Figure 5, the head plates are held in their mutually remotest position. Therefore, axial reciprocation of the reciprocating shaft 33 produces vertical reciprocation of the head plates 26 and 27 with respect to each other.

Since the tip cleaning device 10 herein described has been designed for operation with an automatic resistance welding machine having four pairs of opposed electrodes in a single line, there are four, aligned tip cleaning heads 54 along the top of the upper head plate 26 and four tip cleaning heads 55 aligned beneath the lower head plate 27, said cleaning heads preferably being adjacent to the leading edges 56 and 57 of the upper and lower head plates 26 and 27, respectively.

The lower head plate 27 (Figure 7) is provided with five aligned spaced vertical bushed shaft openings 58 adjacent to its leading edge 57, and the upper head plate 26 is provided with four vertical, bushed shaft openings 59 adjacent to its leading edge 56. The four shaft openings 59 in the upper head plate 26 are axially aligned, respectively, with the four shaft openings 58 nearest to the rightward end of the lower head plate 27, said head plate being taken as appearing in Figures 2, 3, 4 and 5. The lower head plate leading edge 57 is provided with five bearing arms 61, one adjacent to each shaft opening 58, said bearing arms preferably being integral with said lower head plate. A sleeve bearing 62 having a bushed opening 63 is supported by each bearing arm 61 intermediate said upper and lower head plates, each of said openings 63 being spaced from and axially aligned with one of said five shaft openings 58 in said lower head plate 27.

An extensible head shaft 64 (Figures 6 and 7) is rotatably associated with each set of three aligned bushed vertical, openings including, one lower head shaft opening 58, one bearing opening 63 and one upper head plate shaft opening 59. Each of the four head shafts 64 is comprised of an upper portion 65 and lower portion 66 which portions may be moved axially away from or toward each other moderate distances while continuing to rotate one with the other. In this embodiment of the invention, the lower end of each upper portion 65 is provided with a groove 67 (Figure 7) which slidably receives a tongue 68 which is integral with and extends upwardly from the upper end of each head shaft lower portion 66. The head shaft upper portions 65 are rotatably and slidably mounted within the upper head plate shaft openings 59, and the head shaft lower portions 66 are rotatably and slidably mounted in the bearing openings 63 and the lower head plate shaft openings 58.

Inasmuch as each of the four head shaft assemblies 60, which include the head shaft 64, the upper and lower heads 54 and 55, respectively, and other associated parts, hereinafter described in detail, are identical with each other, the following description will be made with express reference to only a single head shaft assembly, bearing in mind that such description applies to each of the four assemblies.

The upper end of each head shaft upper portion 65, which ends extends above the upper head plate 26, removably engages a shaft well 70 in the upper tip cleaning head 54. Said head 54 may be removably secured to said head shaft upper extended end by any suitable detent device, such as the spring loaded ball 69 and cooperating socket 71 (Figure 7).

The upper tip cleaning head 54, which head is preferably identical with the lower tip cleaning head 55, is substantially cylindrical in shape and is provided with an annular ridge 72 substantially parallel with and remote from its adjacent head plate. A suitable sheet of abrasive material is stretched over the annular ridge 72 of the tip cleaning head and held firmly against the cylindrical side wall thereof, with the abrasive facing outwardly, by means of a tight fitting circular ring 73, such as a rubber grommet. The head recess 74, created by the annular ridge 72, imparts some flexibility to the abrasive sheet 75 stretched across said ridge.

The lower tip cleaning head 55 is provided with a shaft well 76 which slidably engages the lower end of said head shaft lower portion 66, extending below the lower head plate 27. A detent device, which may be identical to the one used with the upper tip cleaning head 54, may be used to removably secure said lower tip cleaning head 55 to said head shaft lower portion 66. The lower tip cleaning head 55 is also provided with annular ridges 72a, a head recess 74a, an abrasive sheet 75a and a circular ring 73a, which parts are preferably identical with those associated with the above-described upper tip cleaning head 54.

The head shaft 64 is rotated about a vertical axis by means of the gear pinion 81, which pinion is sleeved upon the head shaft lower portion 66 between the lower head plate 27 and the sleeve bearing 62. That section 77 (Figure 7) of the head shaft lower portion 66 engaged by said gear pinion is conveniently out of round, thereby providing a simple, vertically slidable, means of engagement between said shaft and said pinion.

An upper thrust collar 82 is sleeved upon the head shaft upper portion 65 and secured thereto, adjacent to the lower surface of the upper head plate 26, by any suitable means such as the screw 83. A lower thrust collar 84 is sleeved upon the head shaft lower portion 66 and secured thereto, adjacent to the top side of the sleeve bearing 62, by any suitable means such as the set screw 85. An appropriate coil spring 86 is sleeved upon the head shaft 64 between the opposed surfaces of the upper and lower thrust collars 82 and 84, respectively. The said opposed faces of said upper and lower thrust collars 82 and 84 may be recessed slightly to prevent accidental displacement of the coiled spring 86 which is held under compression therebetween.

It will be observed that the extensible structure of the head shaft 64, and the means for slidable support thereof within said head plates, permits the head shaft upper and lower portions 65 and 66, respectively, to be urged toward each other slightly against the compression of the coiled spring 86. The thrust collars 82 and 84, which bear against the upper head plate 26 and sleeve bearing 62, respectively, limit the extent to which the coiled spring 86 can urge said head shaft upper and lower portions away from each other.

For the purposes of easy identification, that corner of the tip cleaning device at the rightward end of the leading side thereof, as appearing in Figures 2 and 4, will hereinafter be referred to as the first corner. The corner at the opposite or leftward end of said leading side, as appearing in Figures 2 and 4, will hereinafter be referred to as the second corner. The remaining corner at the leftward end of the device will be referred to as the third corner thereof, and the remaining corner at the rightward end of the device (Figures 2 and 4) will hereinafter be referred to as the fourth corner. It will be understood that such designation of the corners of the device is not intended to impose any limitations upon the scope of the invention.

The opening 63 in the sleeve bearing 62 (Figures 4 and 8) and the corresponding axially aligned shaft opening 58 at the said second corner, namely, at the leftward end of the lower head plate 27, are mutually engaged by a stub shaft 87 which rotatably supports a gear pinion 88 between said sleeve bearing and said lower head plate.

A bearing arm 91 (Figures 4 and 8), which may be identical in all respects to the bearing arm 61, is preferably integral at its lower end with the third corner of the lower head plate trailing edge 92 and supports a sleeve bearing 93 at its upper end.

A stub shaft 95 which may be supported between the bearing 93 and head plate 27 in a manner identical to that of the stub shaft 87, rotatably supports an idling gear 94 between the sleeved bearing 93 and the lower head plate 27. An idling gear 96 (Figures 4 and 7) is rotatably supported upon a gear bracket 97, which bracket is adjustably mounted upon the lower head plate 27 adjacent to the lower head plate trailing edge 92 intermediate the third and fourth corners of said lower head plate.

An idling gear 98 at the fourth corner (Figures 4, 5 and 6) is secured to and rotatable with a vertical gear shaft 99, which shaft is secured at its lower end, as by means of the nut 101, to the lower head plate 27 and extends vertically, upwardly therefrom. A driven bevel gear 102 is secured to and rotatable with the upper end of the gear shaft 99, above the gear 98. Said driven bevel gear 102 is operably engaged by a driving bevel gear 103 which is supported upon and rotatable with the driving shaft 104 of a suitable motor 105 of any convenient conventional type. The motor 105, of any type effective to supply controllable rotation and which in this embodiment of the invention is a pneumatic motor, is mounted upon the lower head plate 27 adjacent to and preferably parallel with the reciprocable shaft 33.

As shown diagrammatically in Figure 1, the air hose 106 supplies compressed air from the supply tank 108 to the motor 105 through the air control valve 109. The air hoses 110 and 111 supply compressed air from said tank 108 to the air cylinder 32 through the valve 112. The valves 109 and 112 are controlled by the timer 23, thereby synchronizing the actuation of the pneumatic motor 105 and the vertical reciprocation of the head plates 26 and 27 with the horizontal reciprocation of the tip cleaning device 10, and the energizing of the upper and lower electrodes 17 and 18, respectively.

The gears 81, 88, 94, 96 and 98, which preferably all rotate substantially within the same horizontal plane (Figure 4), are mutually engaged by an endless chain 107 of any conventional type. Therefore, when the motor 105 is actuated, thereby causing the driving bevel gear 103 to rotate the driven bevel gear 102, the gears 81, 88, 94 and 96 are all rotated about their own axes by the gear 98 acting through the chain 107. Rotation of each gear pinion 81 produces a rotation of each head shaft 64 and the upper and lower tip cleaning heads 54 and 55, respectively, secured thereto.

Operation

The electrode tip cleaning device 10 is mounted upon the bed 12 (Figure 1) of a resistance welding machine 13 so that the actuating cylinder 15 moves said device 10 into cleaning position between the electrodes 17 and 18, and preferably does so from the rearward end of the welding machine. Thus, the material being welded by the electrodes can be fed into the welding machine from the forward end of the machine. However, this arrangement is optional and is not intended to limit the invention.

The timer 23 may be adjusted in a conventional manner so that the cleaning device 10 is moved between the electrodes 17 and 18 after any desired number of welding operations. At the close of a selected welding cycle the fluid flow regulator 21 is actuated by the timer 23 to direct hydraulic fluid from an appropriate supply 22 of fluid under pressure into the actuating cylinder 15, whereby the actuating arm 16 is extended from said cylinder 15 and the device 10 is moved into cleaning position between the electrodes 17 and 18.

When the device 10 reaches cleaning position, the timer 23 causes the control valve 112 to direct the flow of compressed air from the supply tank 108 through the hose 110 into the air cylinder 32 (Figures 1, 3 and 4). The air cylinder 32, thus actuated, causes the reciprocating shaft 33 to move rightwardly (Figures 3 and 4) which, through conventional operation of the several toggle arms, toggle blocks and pivot blocks, causes the head plates 26 and 27 to move away from each other.

The springs 86, bearing against the opposed surfaces of the thrust collars 82 and 84 cause said upper and lower head shaft portions to move away from each other while maintaining mutually operable contact through the groove 67 and tongue 68. Thus, the upper and lower tip cleaning heads 54 and 55, respectively, are also moved away from each other with the head plates 26 and 27.

The cleaning heads 54 and 55 may be prealigned with the upper and lower electrodes 17 and 18, respectively, so that upward and downward movement of the cleaning heads 54 and 55, respectively, causes the abrasive sheets 75 and 75a, secured to said heads, to bear against the tips of the electrodes 17 and 18, respectively. The head recesses 74 and 74a permit the abrasive sheets associated therewith to curve around the electrode tips and provide some resilience in the contacting surface of the cleaning heads.

The cleaning heads 54 and 55 (Figures 6 and 7) preferably engage the electrodes 17 and 18 slightly before the head plates 26 and 27 are fully separated. The head plates therefore, will move further away from each other sufficiently to leave a little space between the upper head plate 26 and each thrust collar 82, and between each sleeve bearing 62 and lower thrust collar 84. Thus, the coil spring 86, is enabled to hold said cleaning heads 54 and 55 firmly, and under full spring pressure, against the electrodes 17 and 18, respectively. The out of round sections 77 of the head shaft lower portions 66 permit the head shaft lower portions 66 to move vertically with respect to said gear pinions 81 without disengaging the pinions 81 from the sections 77 and without causing said out of round sections to interfere with the sleeve bearings 62 or the lower head plate shaft openings 58.

The tip cleaning heads 54 and 55 may be adjusted with respect to the head plates 26 and 27, respectively by appropriate placement of the thrust collars 82 and 84 upon the head shaft upper and lower portions 65 and 66, respectively.

Approximately when the cleaning heads 54 and 55 engage the electrodes 17 and 18, the timer 23 causes the valve 109 to pass compressed air from the tank 108 through the hose 106 to actuate the pneumatic motor 105. The driving bevel gear 103, driven by said motor 105 rotates the driven bevel gear 102 and through it the driving pinion 98. The endless chain 107, driven by the driving pinion 98 engages and drives the gear pinions 81 and thereby rotates the head shafts 64 and the cleaning heads 54 and 55 attached thereto. The proper amount of tension may be maintained in the endless chain 107 by appropriate adjustment of the adjustable gear bracket 97 upon the lower head plate 27.

The rotational movement of the heads 54 and 55 causes the abrasive sheets, or cutters, 75 and 75a secured thereto to remove the contaminating particles from the tips of the electrodes. After a predeterminable period of cleaning action, the timer 23 closes the valve 109 which stops the motor 105 and, accordingly, the rotation of the cleaning heads 54 and 55. The timer then causes the valve 112 to direct the flow of compressed air through the air hose 111 to the air cylinder 32 so that the reciprocable shaft 33 is moved leftwardly (Figures 3 and 4), thereby moving the head plates 26 and 27 toward each other and the cleaning heads 54 and 55 away from contact with said electrodes 17 and 18, respectively.

The timer 23 then causes the fluid flow regulator 21 to pass hydraulic fluid under pressure into that end of the actuating cylinder 15 which causes the arm 16 to retract, thereby withdrawing the tip cleaning device 10 from the cleaning position between the electrodes 17 and 18. The removal of the cleaning device 10 from the position between the electrodes 17 and 18 completes the operating cycle of said cleaning device. This cycle may be repeated as often as desired and may be speeded up or slowed down to meet the specific demands within the scope of this invention.

The electrode reciprocator 24, which in this embodiment moves the lower electrode only, may then be actuated by the timer 23 to initiate the next welding cycle in any conventional manner.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. An automatic electrode cleaning device for use with a welding machine having an electrode, comprising: a pair of substantially parallel, spaced, superposed, head plates and means for vertically reciprocating one head plate toward and away from the other; a shaft rotatably supported upon said head plates and extending through said one head plate, said pair of head plates being bodily movable to align said shaft axially with said electrode; means for rotating said shaft; a cleaning head secured to the end of said shaft extending through said one head plate and having a cleaning surface for contacting said electrode; said head being movable with said one head plate and with respect to said other head plate and resilient means urging said head away from said other head plate and causing it to engage said electrode with a yielding pressure.

2. An automatic electrode cleaning device for a welding machine having an electrode comprising: a pair of spaced, substantially, parallel superposed head plates and means for reciprocating one head plate toward and away from the other; a shaft rotatably supported upon said head plates and extending through said one head plate, said pair of head plates being movable to align said shaft axially with said electrode; means for rotating said shaft; a cleaning head secured to the end of said shaft extending through said one head plate and having a cutting surface for contacting said electrode; said head being movable with said one head plate and with respect to said other head plate and resilient means urging said head away from said other head plate; and means controlling the operation of said device whereby when said device is moved into electrode cleaning position, said cleaning head may be caused to engage said electrode, rotated, disengaged therefrom, and said device may then be withdrawn from said cleaning position.

3. An automatic, electrode cleaning device for use with a welding machine having a pair of opposed electrodes comprising: a pair of substantially parallel, superposed, spaced head plates reciprocably secured to each other and extensible shaft slidably and rotatably supported perpendicularly to and upon said head plates and extending therethrough; means supporting said device on said machine for movement into and out of position and when in position between said electrodes said shaft is between and axially aligned with said electrodes; means for rotating said shaft; a pair of cleaning heads movable with said head plates and secured for rotation to the opposite ends of said shaft, said heads having cutting surfaces at their mutually remote ends; resilient means yieldingly resisting movement of said head plates towards each other; and means controlling the operation of said device, whereby said device is moved into position between said electrodes, said cleaning heads are caused to engage said electrode tips, are rotated and then disengaged from said electrode tips, and said device is withdrawn from between said electrodes.

4. An automatic, electrode cleaning device mountable upon a welding machine having a pair of opposed electrodes comprising: a base plate horizontally reciprocably supported upon said welding machine, and means for moving said base plate into and out of position between said electrodes; upper and lower, parallel head plates vertically slidably supported upon said base plate; means supported upon said base plate for vertically reciprocating said head plates toward and away from each other; an extensible shaft slidably and rotatably supported upon and extending through said head plates, said shaft being axially alignable with said electrodes; drive means selectably rotating said shafts a pair of cleaning heads movable with said head plates and secured to and rotatable with the opposite ends of said shaft, said heads having cleaning surfaces remote from said head plates; resilient means yieldingly resisting movement of said cleaning heads toward each other; and means controlling the operation of said device, whereby said device is moved into position between said electrodes, said cleaning heads are caused to engage said electrode tips, are rotated and then disengaged from said electrode tips, and said device is withdrawn from between said electrodes.

5. In an automatic, electrode tip cleaning device mountable upon an automatic resistance welding machine having a plurality of welding electrodes in opposed pairs, the combination comprising: a base plate reciprocably mounted upon the frame of said welding machine for movement into and out of position between said opposed electrodes, and means for reciprocating said base plate; guides secured to said base plate and extending therefrom; spaced substantially parallel, superposed head plates supported upon said guides for movement toward and away from each other; a reciprocable shaft slidably supported upon said base plate between said head plates and means for axially reciprocating said shaft; toggle linkage connecting said shaft to said head plates, whereby axial movement of said shaft in one direction causes said head plates to move away from each other and axial movement of said shaft in the opposite direction causes said head plates to move toward each other; an extensible drive shaft slidably and rotatably supported upon and extending through said head plates, said shaft being alignable with one pair of said electrodes; a pair of cleaning heads movable with said head plates and secured to and rotatable with the opposite ends of said drive shaft, said heads having cleaning surfaces remote from said head plates; resilient means yieldingly resisting movement of said cleaning heads toward each other, and means controlling the operation of said device, whereby said device is moved into position between said electrodes, said cleaning heads are caused to engage said electrode tips under a yielding pressure are rotated and then disengaged from said electrode tips, and said device is withdrawn from between said electrodes.

6. An automatic, electrode tip cleaning device for a resistance welding machine having a pair of opposed electrodes comprising: a base plate reciprocably mounted upon said welding machine for movement into and out of position between said electrodes, and means for timably reciprocating said base plate spaced head plates supported upon said base plate for reciprocable movement toward and away from each other; a reciprocable shaft supported upon said base plate between said head plates and means for axially reciprocating said shaft; means for connecting said shaft to said head plates, whereby reciprocation of said shaft causes movement of said head plates toward and away from each other; a two-piece, extensible head shaft slidably and rotatably supported upon said head plates, said head shaft extending through each of said head plates and being axially aligned with said electrodes when said base plate is positioned therebetween; drive means controllably rotating said shaft; a locking collar sleeved upon and secured to each piece of said head shaft; a coiled spring sleeved upon said head shaft and held under compression between said locking collars; a pair of cleaning heads respectively secured to and rotatable with the opposite ends of said head shaft, said heads having cleaning surfaces remote from said head plates; and means controlling the operation of said device, whereby said device is moved into position between said electrodes, said cleaning heads are caused to engage said electrode tips, are rotated and then disengaged from said electrode tips, and said device is withdrawn from between said electrode.

7. In an automatic, electrode tip cleaning device mountable upon an automatic resistance welding machine having a plurality of welding electrodes in opposed pairs, the combination comprising: a base plate reciprocably mounted upon the frame of said welding machine for movement into and out of position between said opposed electrodes, and means for reciprocating said base plate; guide corner posts secure to said base plate adjacent to respective corners thereof and extending therefrom; upper and lower, spaced, superposed head plates slidably supported upon said guide posts for movement toward and away from each other; a reciprocable shaft slidably supported upon said base plate midway between said head plates and means for reciprocating said shaft; means connecting said shaft to said head plates, whereby axial movement of said shaft in one direction causes said head plates to move away from each other and axial movement of said shaft in the opposite direction causes said head plates to move toward each other; a plurality of two-piece, extensible head shafts rotatably and slidably supported upon said head plates perpendicularly thereto, said head shafts being rotatable and extending through and beyond each of said head plates, and said head shafts being axially aligned with said pairs of electrodes when said base plate is moved therebetween; drive means rotating said head shafts; a pair of locking collars sleeved upon each of said head shafts between said head plates, one of said collars being secured to each piece of said head shaft; a coiled spring sleeved upon each head shaft, said spring being held under compression between said locking collars; a plurality of cleaning heads secured to and rotatable with each of the opposite ends of said head shafts, said heads having abrasive surfaces remote from said head plates; whereby actuation of said base plate will align said cleaning heads with said electrodes, actuation of said reciprocable shaft will effect contact between said cleaning heads and said electrode tips, actuation of said drive means for a predetermined period of time will rotate said cleaning heads against said tips to clean same, and reverse actuation of said reciprocable shaft and said base plate will retract said cleaning heads and withdraw said device from between said electrodes.

SIMON FISHER.

REFERENCES CITED

The following references are of record in the file of this patent:

UNITED STATES PATENTS

| Number | Name | Date |
| --- | --- | --- |
| 2,300,173 | Platz | Oct. 27, 1942 |
| 2,357,038 | Whitesell | Aug. 29, 1944 |
| 2,373,932 | Waters | Apr. 17, 1945 |